United States Patent

Ma et al.

(10) Patent No.: US 8,155,380 B2
(45) Date of Patent: Apr. 10, 2012

(54) METHOD AND APPARATUS FOR THE RECOGNITION OF OBSTACLES

(75) Inventors: Guanglin Ma, Shanghai (CN); Ing Su-Birm Park, Aldenhoven (DE); Alexander Ioffe, Bonn (DE)

(73) Assignee: Delphi Technologies, Inc., Troy, MI (US)

( * ) Notice: Subject to any disclaimer, the term of this patent is extended or adjusted under 35 U.S.C. 154(b) by 894 days.

(21) Appl. No.: 12/231,550

(22) Filed: Aug. 29, 2008

(65) Prior Publication Data

US 2009/0080702 A1 Mar. 26, 2009

(30) Foreign Application Priority Data

Sep. 24, 2007 (EP) .................................... 07018733

(51) Int. Cl.
*G06K 9/00* (2006.01)
*B60Q 1/00* (2006.01)
(52) U.S. Cl. ........................................ 382/103; 340/435
(58) Field of Classification Search .................. 382/103, 382/104; 340/435, 539.22, 539.26, 545.2, 340/547, 598, 619; 701/10, 201, 223, 226; 180/9.32; 434/68
See application file for complete search history.

(56) References Cited

U.S. PATENT DOCUMENTS 5,377,106 A * 12/1994 Drunk et al. .................... 701/25
7,202,776 B2 * 4/2007 Breed ........................... 340/435

FOREIGN PATENT DOCUMENTS

EP 1646008 4/2006

OTHER PUBLICATIONS

Ma, Guanglin; Park, Su-Birm; Ioffe, Alexander; Muller-Schneiders, Stefan; Kummert, Anton: "A Real Time Object Detection Approach Applied to Reliable Pedestrian Detection" Intelligent Vehicles Symposium, 2007 IEEE, Jun. 13, 2007 755-760.

* cited by examiner

*Primary Examiner* — Abolfazl Tabatabai
(74) *Attorney, Agent, or Firm* — Paul W. Thiede

(57) ABSTRACT

A method and apparatus for recognizing obstacles in an environment about a motorized vehicle moving along a roadway is presented. The apparatus includes an optical sensor and a data processing device. A method using the apparatus includes taking images with the optical sensor which contains at least a first and a second image. The first and the second image are each transformed above and below a plane as viewed by the optical sensor to further determine upper and lower difference images by the data processing device. The data processing device further determines whether an obstacle is located in the travel path of the vehicle by evaluation of the lower and upper difference images.

9 Claims, 2 Drawing Sheets

METHOD AND APPARATUS FOR THE RECOGNITION OF OBSTACLES

RELATED DOCUMENTS

This application claims priority to European Application No. 07018733.1 filed on 24 Sep. 2007.

TECHNICAL FIELD

The invention relates to a method for the recognition of an obstacle, in particular a pedestrian, located in the travel path of a vehicle, in the environment in the range of view of an optical sensor attached to the vehicle.

BACKGROUND OF INVENTION

Methods of this kind are known. They in particular serve to be able to prevent collisions with pedestrians in road traffic or, optionally, still to be able to take suitable safety measures in good time.

It is known to recognize obstacles with the help of sensors, e.g. acceleration sensors and/or contact sensors, which are arranged in the region of a bumper of a motor vehicle. However, sensors of this type permit recognition of obstacles only when they are in the direct proximity of the vehicle or when a collision has already taken place.

The use of cameras in motor vehicles is also generally known, for example to image the environment of the motor vehicle on a display visible to the driver of the motor vehicle as a parking aid.

Generally, however, the amount of the image data to be processed and the automatic evaluation of the generated images have proven to be problematic with the use of cameras. This applies in particular when the evaluation of the image material not only has to take place automatically, but also particularly fast, such as is required, for example, in a vehicle safety system for the protection of persons on a collision with the motor vehicle.

A method is already known from EP 1 646 008 A1 for the recognition of an obstacle, in particular a person, located in a path of travel of a motor vehicle, wherein a first image and, spaced apart in time therefrom, a second image is taken of the environment of the motor vehicle in the direction of travel by means of a camera; a first transformed image is generated by projection of the first image taken from the plane of the camera into the plane of the ground and a second transformed image is generated by projection of the second image taken from the image plane of the camera into the plane of the ground; a difference image is determined from the first and second transformed images, and it is determined by evaluation of the difference image whether an obstacle is located in the path of travel of the vehicle.

This known apparatus has proven itself in practice. However, due to the geometrical conditions here, only obstacles or parts of obstacles above the ground plane can be detected which lie below the horizon. In a number of cases, however, one would like to detect the total contour, that is both the part of the obstacle lying below the horizon and the part of the obstacle lying above the horizon, to ensure a more reliable detection of the obstacle.

SUMMARY OF THE INVENTION

It is the underlying object of the invention to provide a method which enables recognition of an obstacle, in particular a pedestrian, located in a travel path of vehicle, which is as fast as possible and at least substantially complete in a simple and reliable manner. In this context, it should be ensured that both the region below the horizon and the region above the horizon are detected.

Further features, uses and advantages of the invention will appear more clearly on a reading of the following detailed description of the invention, which is given by way of non-limiting example only and with reference to the accompanying drawings.

BRIEF DESCRIPTION OF THE DRAWINGS

This invention will be further described with reference to the accompanying drawings in which.

DETAILED DESCRIPTION

Figure 1:
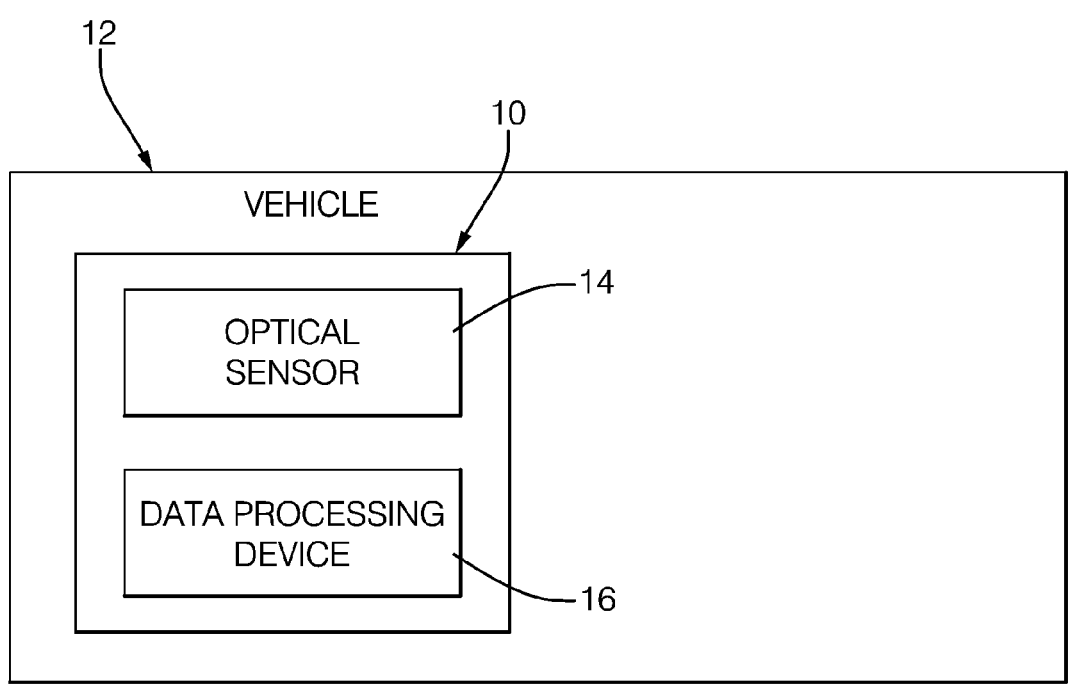
FIG. 1 shows a block diagram of an apparatus used to recognize an obstacle in an environment, and details thereof.
Figure 2:
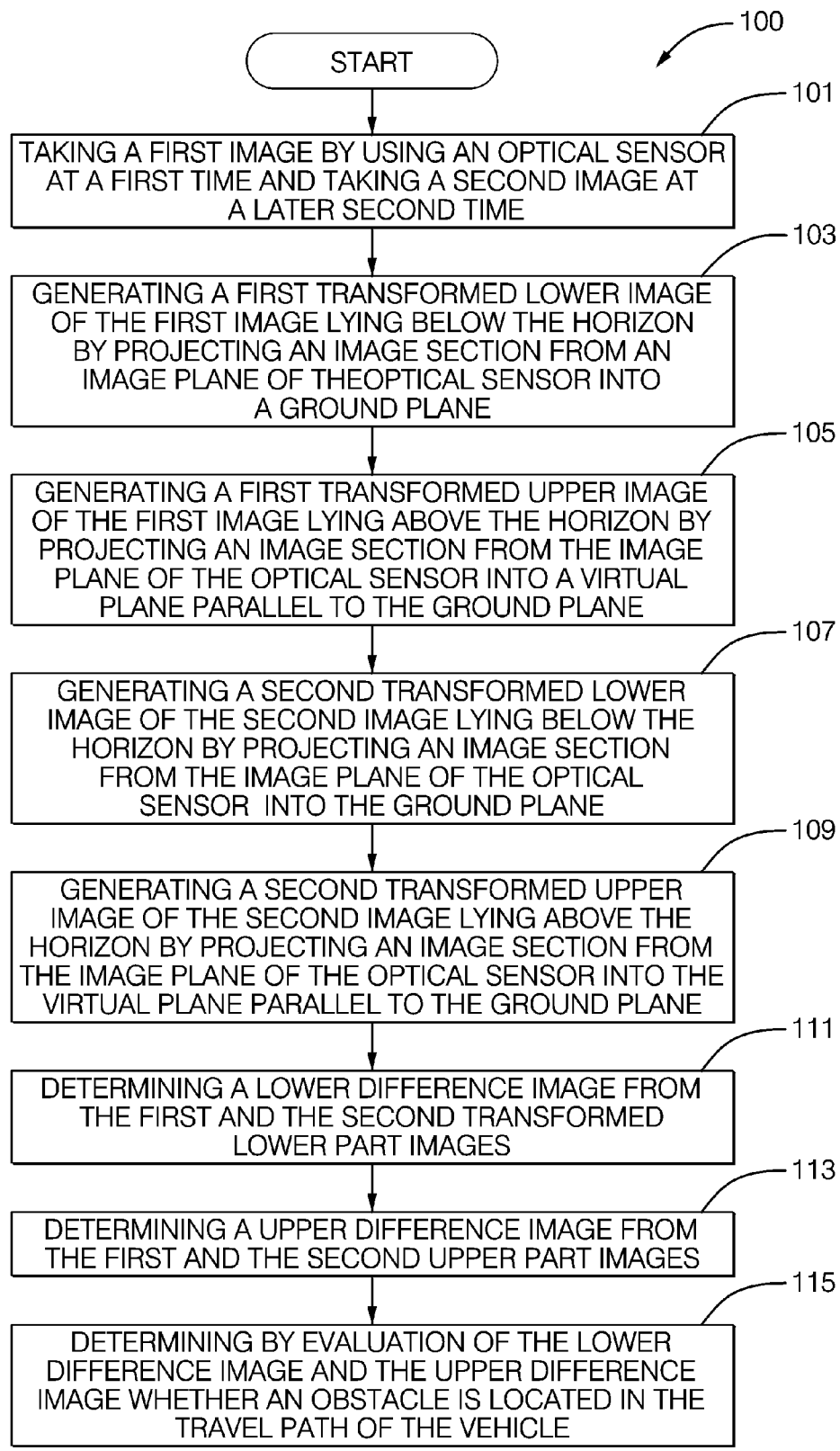
FIG. 2 shows a method using the apparatus of FIG. 1 to recognize the obstacle in the environment.

Referring to FIGS. 1 and 2, and in accordance with the invention, the abovementioned objective is satisfied by an apparatus 10 and a method 100 for the recognition of an obstacle. In particular, the obstacle may be a pedestrian located in the travel path of a movable carrier, or motorized vehicle 12 that is in the environment in the range of view of an optical sensor 14 attached to vehicle 12. Apparatus 10 includes optical sensor 14 and a data processing device 16 that are attached to vehicle 12, as best illustrated in FIG. 1.

Referring to FIG. 2, method 100 uses apparatus 10 to achieve the recognition of the object in the environment in view of optical sensor 14. One step 101 in method 100 is taking a first image by means of the optical sensor at a first time and taking a second image at a later second time. Another step 103 in method 100 is generating a first transformed lower part image by a projection of an image section of the first taken image lying below the horizon from the image plane of optical sensor 14 into the ground plane. A further step 105 in method 100 is generating a first transformed upper part image by a projection of an image section of the first taken image lying above the horizon from the image plane of the optical sensor into a virtual plane parallel to the ground plane. Another step 107 in method 100 is generating a second transformed lower part image by a projection of an image section of the second taken image lying below the horizon from the image plane of the optical sensor into the ground plane. A further step 109 in method 100 is generating a second transformed upper part image by a projection of an image section of the second taken image lying above the horizon from the image plane of optical sensor 14 into a virtual plane parallel to the ground plane. Another step 111 in method 100 is determining a lower difference part image from the first and second transformed lower part images. A further step 113 in method 100 is determining an upper difference part image from the first and the second transformed upper part images. Another step 115 in method 100 is determining by evaluation of the lower difference part image and of the upper difference part image whether an obstacle is located in the travel path of vehicle 12.

Due to this design, not only an early and fast recognition of a respective obstacle located in the travel path of vehicle 12 is ensured, it is also ensured that not only the region located between the ground plane and the horizon, but simultaneously also the region above the horizon is detected, whereby the reliability of the obstacle detection is further increased. Potential obstacles are therefore also detected reliably and fast in particular in the region between the horizon and the virtual plane lying above it.

The advantage is additionally achieved with the inverse perspective imaging, that is the projection from the image plane into the ground plane with subsequent back projection, in comparison with an edge extraction, that background information is at least substantially eliminated.

The determination of obstacles with reference to difference images permits the processing and evaluation of images which do not contain any spatial information. Optical sensor 14 may be a mono camera which, in comparison to a stereo camera, for example, permits the taking of the images while generating substantially smaller data amounts with the same image size and resolution. The images of a mono camera can thus not only be evaluated particularly fast, but also require a lower computation power.

The difference image is not determined directly from the images taken by optical sensor 14, in particular a camera, that is from the original images, but is rather determined from transformed images which were generated by a projection of the image objects from the image plane of optical sensor 14 into the plane of the ground.

By the projection of the images taken by optical sensor 14 onto the ground, a rectangular image format becomes a trapezoidal image format, with the short parallel side of the trapezoid bounding the image region close to vehicle 12 and the long parallel side of the trapezoid bounding the image region remote from vehicle 12.

The image transformation results in a correct, i.e. substantially distortion-free, imaging of the ground in the transformed image, whereas image objects such as pedestrians who stand off from the ground in reality and e.g. extend perpendicular thereto are shown in distorted form and in particular wedge-shaped in the transformed image.

Image objects which can be considered as possible obstacles for the vehicle can be distinguished particularly well from those which are not relevant to safety by the selective distortion of image objects which cannot be associated with the ground. This permits a particularly reliable recognition of obstacles, in particular of pedestrians.

In the evaluation of a respective difference image determined from two images spaced apart in time, the effect is utilized that the imaging of an object which is closer to the vehicle changes more strongly and in particular becomes larger faster when the vehicle is moving than an object which is further remote from the vehicle. In this manner, an object located in the foreground of the image can be distinguished, for example, from an object located in the background of the image and can be identified as an obstacle, where applicable.

As already mentioned, a respective object classified as an obstacle is preferably transformed back into the image plane of optical sensor 14.

A camera, in particular a video camera, can be used as optical sensor 14, for example. A monocamera is preferably used as the optical sensor.

Vehicular movement, in particular the vehicle speed and/or the change in the travel direction, and the time duration between the first and the second taking times are expediently taken into account in the determination of the difference part images from the respective first and second transformed part images. A change in the direction of view of the optical sensor on a movement of vehicle 12 is taken into account in this manner. This results in transformed images which can be compared better, whereby ultimately the reliability of a correct recognition of an obstacle is increased.

Vehicular movement is preferably taken into account by translation and rotation of the first transformed lower part image and of the second transformed lower part image relative to one another and by translation and rotation of the first transformed upper part image and of the second transformed upper part image relative to one another. This permits a correct positioning of transformed images spaced apart in time relative to one another and thus an optimum comparison of the transformed images.

As a result, the respective difference image has a maximum contrast between image objects which do not change substantially, such as a road section in the direction of travel, and image objects which become larger fast. The transformed image of an object which in reality projects above the ground can thus be distinguished from the ground even better. An even more reliable recognition of obstacles is thereby possible. This may be achieved with a corresponding translation and rotation of sections of the vehicle environment which are respectively the same can be made to coincide. It is thereby ensured that, on the determination of the respective difference image, the difference of the gray values is formed by those picture elements which correspond at least approximately to the same locations of the vehicle environment.

Picture elements of those objects which have not changed substantially from the first transformed image to the second transformed image—such as the image of a road are therefore eliminated in the forming of the respective difference and result in a gray value of at least approximately zero in the difference image. Only the picture elements of those objects which are located in the closer environment of vehicle 12 and project over the ground and are therefore distorted and in particular presented in wedge shape in the transformed images cannot be brought into congruence when vehicle 12 moves toward the object. Since the image of the object becomes larger as the carrier or vehicle 12 approaches, at least the picture elements defining the edge region of the object in the difference image have a gray value substantially different from zero. An object projecting above the ground can thereby be distinguished from the ground with even greater reliability and an obstacle can be determined even more reliably.

In particular, a wedge-shaped object of a respective difference image is preferably classified as an obstacle. As has already been mentioned, an object of the difference image is an object whose picture elements have not been eliminated in the forming of the difference. The transformed image of an object of this type must therefore change, in particular become larger, from one transformed image to the next. This is particularly the case when it is the image of an object located in the closer environment of vehicle 12 and projecting above the ground. Provided this object is located in the travel path of vehicle 12, it can be considered an obstacle for vehicle 12.

An object of a respective difference image or difference images classified as an obstacle can be transformed back into the taken images. This makes it possible also to mark an object classified as an obstacle as such in the images taken, for example by a corresponding coloring or by a frame.

Advantageously, in particular problems caused by possible road irregularities such as an inclination, vehicular vibrations and/or the like are compensated by an image stabilization. The contact of the difference images is further increased by the corresponding minimization of the image noise so that an object to be classified as an obstacle can be determined even more reliably.

A subject of the invention is furthermore a computer program with programming code means to carry out the method described above when the program is carried out on a computer or on a corresponding computing unit.

A computer program product is also a subject of the invention having programming code means stored on a computer readable data carrier, or data processing device 16 to carry out method 100 described previously herein when the computer program is carried out on a computer or on a corresponding computing unit.

In this connection, a computer is understood as any desired data processing device with which the method can be carried out. In this connection, such a data processing device can in particular include digital signal processors and/or microprocessors with which the method can be carried out in full or in parts.

Finally, an object of the invention is also a device for the recognition of an obstacle, in particular a pedestrian, located in the travel path of a vehicle, in the environment in the range of view of an optical sensor attached to the vehicle. The device has a data processing unit which is designed to carry out method 100 previously described herein.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A method for recognition of an obstacle in an environment in view of an optical sensor attached to a vehicle, said environment including a travel path of the vehicle, comprising:

taking a first image by using the optical sensor at a first time and taking a second image at a later second time;

generating a first transformed lower image of the first image lying below the horizon by projecting an image section from an image plane of the optical sensor into a ground plane;

generating a first transformed upper image of the first image lying above the horizon by projecting an image section from the image plane of the optical sensor into a virtual plane parallel to the ground plane;

generating a second transformed lower image of the second image lying below the horizon by projecting an image section from the image plane of the optical sensor into the ground plane;

generating a second transformed upper image of the second image lying above the horizon by projecting the image section from the image plane of the optical sensor into the virtual plane parallel to the ground plane;

determining a lower difference image from the first and the second transformed lower part images;

determining an upper difference image from the first and the second upper part images; and determining by evaluation of the lower difference image and the upper difference image whether the obstacle is located in the travel path of the vehicle.

2. The method in accordance with claim 1, wherein a respective object is classified as the obstacle and is transformed back into the image plane of the optical sensor.

3. The method in accordance with claim 1, wherein the optical sensor is a video camera.

4. The method in accordance with claim 3, wherein the optical sensor is a mono-camera.

5. The method in accordance with claim 1, wherein vehicle speed, change in vehicle travel direction, and time duration between the first and the second taking times are considered in the determination of the difference images from the respective first and second transformed images.

6. The method in accordance with claim 1, wherein vehicle movement is taken into account by translation and rotation of the first transformed lower image and of the second transformed lower image relative to one another and by translation and rotation of the first transformed upper image and of the second transformed upper part image relative to one another.

7. The method in accordance with claim 1, wherein said travel path includes the vehicle travelling along a road and the road has road irregularities, and said road irregularities are one of, (i) vehicle inclination, and
(ii) vehicle vibration, the method further includes, compensating said road irregularities by image stabilization by an apparatus configured to perform said method, and said apparatus further includes said optical sensor.

8. A media including computer-readable instructions for recognition of an obstacle in an environment in view of an optical sensor attached to a vehicle using a first image taken by the optical sensor at a first time and a second image taken by the optical sensor at a later second time, said environment including a travel path of the vehicle, said computer-readable instructions being adapted to configure a data processing device to carry out a method comprising:

generating a first transformed lower image of the first image lying below the horizon by projecting an image section from an image plane of the optical sensor into a ground plane;

generating a first transformed upper image of the first image lying above the horizon by projecting an image section from the image plane of the optical sensor into a virtual plane parallel to the ground plane;

generating a second transformed lower image of the second image lying below the horizon by projecting an image section from the image plane of the optical sensor into the ground plane;

generating a second transformed upper image of the second image lying above the horizon by projecting the image section from the image plane of the optical sensor into the virtual plane parallel to the ground plane;

determining a lower difference image from the first and the second transformed lower part images;

determining an upper difference image from the first and the second upper part images; and determining by evaluation of the lower difference image and the upper difference image whether the obstacle is located in the travel path of the vehicle.

9. An apparatus for recognition of an obstacle in an environment to a vehicle in which the environment includes a travel path of the vehicle, said apparatus comprising:

an optical sensor attached to a vehicle and having a view of an environment, said optical sensor taking a first image at a first time and a second image at a later second time; and a data processing device adapted to receive the first image and the second image and configured to carry out a method comprising:

generating a first transformed lower image of the first image lying below the horizon by projecting an image section from an image plane of the optical sensor into a ground plane, generating a first transformed upper image of the first image lying above the horizon by projecting an image section from the image plane of the optical sensor into a virtual plane parallel to the ground plane, generating a second transformed lower image of the second image lying below the horizon by projecting an image section from the image plane of the optical sensor into the ground plane, generating a second transformed upper image of the second image lying above the horizon by projecting the image section from the image plane of the optical sensor into the virtual plane parallel to the ground plane, determining a lower difference image from the first and the second transformed lower part images, determining an upper difference image from the first and the second upper part images, and determining by evaluation of the lower difference image and the upper difference image whether the obstacle is located in the travel path of the vehicle.

* * * * *